Patented July 25, 1944

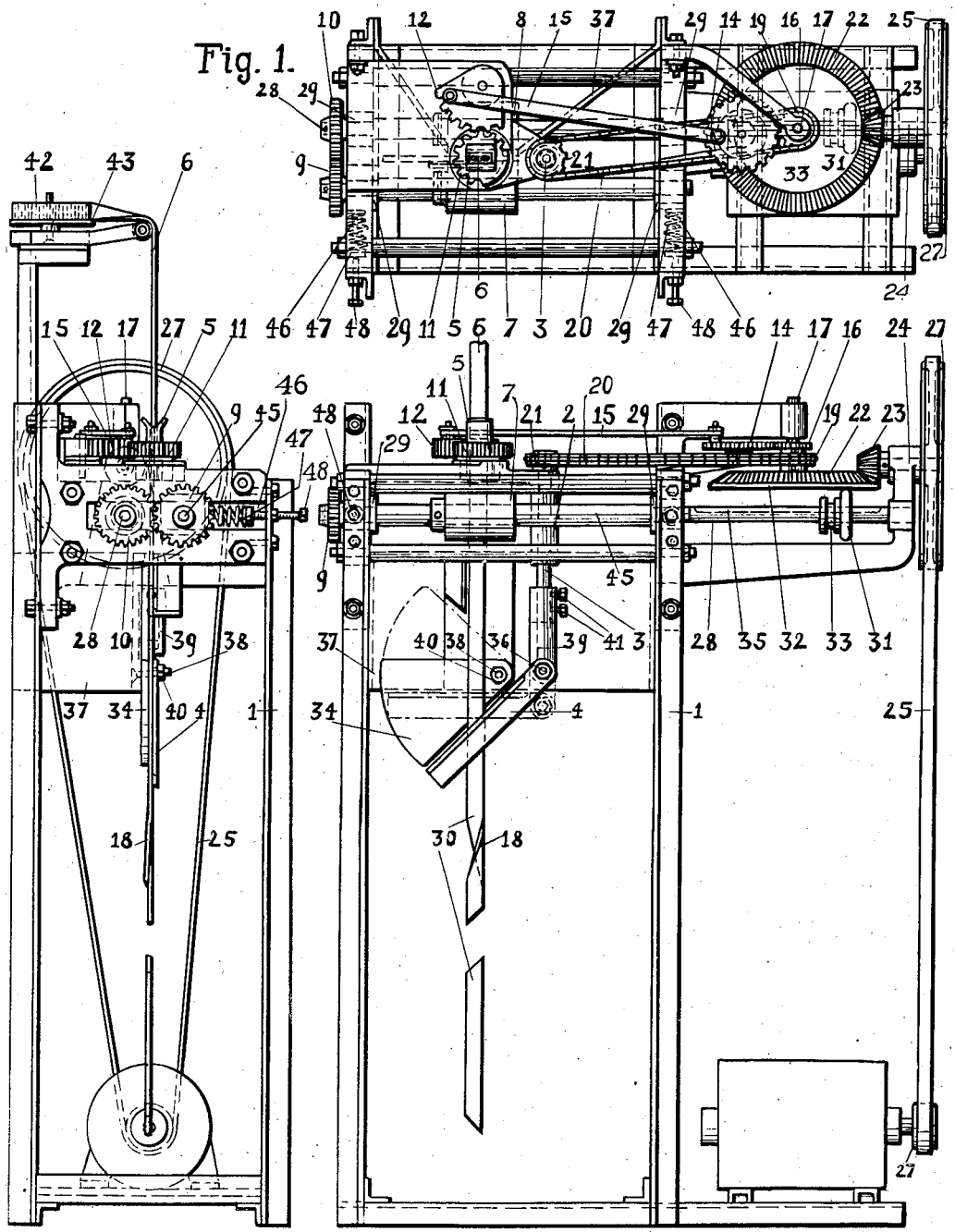

2,354,293

UNITED STATES PATENT OFFICE 2,354,293

TAPE CUTTING MACHINE

Moe Schimmel, New York, N. Y.

Application March 30, 1943, Serial No. 481,085

4 Claims. (Cl. 164—61)

This invention relates to improvements in tape cutting machines; and the objects of my improvement are, first, to provide an alternately continuous turning by S. H. M. of the tape which is to be cut reciprocatingly 180 degrees, so that the pieces cut off by an angularly inclined knife will have trapezoid form; second, to afford facilities for the proper adjustment of the knife and the cutting plate which cooperates with the knife, so that the cut can be biased at any chosen angle or that it can be right angular; third, to afford facilities for the simplest possible adjustment of the length of the pieces which are to be cut off; and fourth, the provision of a device for the purpose stated above, which is simple in construction and operation, which is durable, and which can be manufactured and sold at a comparatively low price.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing:

Figure 1 is a top plan view of the machine as it appears after the removal of the tape-spool and the part carrying the same;

Fig. 2 is a side elevation of the entire machine; and

Fig. 3 is a front elevation of the machine.

Similar numerals refer to similar parts throughout the several views.

My machine consists of a frame 1, supporting a bearing 2 in which a shaft 3 holding an angularly and vertically adjustable rotating knife 4 rotates; of a guide or channel 5 through which the tape 6, strip, ribbon, belt or the like passes and which is adapted to be turned reciprocatingly 180 degrees during each revolution of the rotating knife 4; and of rollers 7 and 8 which are connected to each other by spur gear wheels 9 and 10.

The turning of the tpe 6, belt, ribbon, strip or the like 180 degrees during each revolution of the knife 4 can be accomplished in various ways. It would be possible, for instance, to turn the channel or guide 5 and the rollers 7 and 8 by means of an electro-motor which, together with the rollers 7 and 8, could be mounted upon a disk (not shown) which could be secured to the guide or channel 5. However, in order to make the device as simple and cheap as possible, I prefer to carry out this feature of my invention in the manner shown in the drawing, where it will be seen that the channel or guide 5 is provided with a gear 11 engaging a toothed segment 12, which is connected to a toothed wheel 14 by means of a rod 15; and that a pinion 16, which is secured to a shaft 17, engages the toothed wheel 14. By this arrangement the guide or channel 5 will be turned reciprocatingly when the shaft 17 revolves, and the part of the tape 6 which has passed through the guide or channel 5 during each second movement of this guide or channel will have a crease 18 resulting from the pressure of the rollers 7 and 8 upon the twisted part of the tape 6.

Secured to shaft 17 are also a spur bevel wheel 22 and a chain wheel 19, which is connected by a block or roller chain 20 to a chain wheel 21 secured to shaft 3. A bevel pinion 23, which is secured to a shaft 24, engages the wheel 22. The shaft 24 may be driven by a belt 25 passing round the pulleys 27.

The shaft 28, which carries the roller 8 and the spur gear wheel 10 and which turns in bearings 29, can be provided with any suitable means for connecting it to the wheel 22, so that the shaft 28 will be taken along when the wheel 22 revolves. In order to facilitate the adjustment of the length of the pieces 30 cut off from the tape 6, I prefer to provide the portion of shaft 28 which projects over the right bearing 29 with a groove 35 (Fig. 3); to arrange a friction wheel 31, which engages the groove 35 and which can be shifted axially on said right portion of shaft 28 or held in a desired position by any suitable well-known means; and to provide the lower surface of the wheel 22 with a friction disk 32. The friction wheel 31 is provided with a groove 33 which runs all around and into which any well-known shifting member (not shown) may engage. It will be obvious that the cut off pieces 30 will be shorter if the friction wheel 31 is shifted nearer toward the center of the friction disk 32, and that the cut off pieces 30 will be longer if the wheel 31 is shifted nearer toward the edge of the disk 32.

Since the weight of the disk 32, of the wheel 22, of the shaft 17, and of the wheels 16 and 19 rests upon the friction wheel 31, a good connection between friction wheel 31 and friction disk 32 will always be assured and no springs or the like will be necessary to press the disk 32 against the wheel 31.

The shaft 45, which carries the roller 7 and the spur gear wheel 9, turns also in bearings 29 which, however, are shiftable in slots 46 and which are being pressed toward the roller 8 by springs 47. The pressure of these springs 47 can be adjusted by means of set screws 48.

In order to facilitate the adjustment of the knife 4 and of the cutting plate 34, which cooperates with the knife, so that the cuts can be biased at any chosen angle or so that the cuts will be straight, I prefer to secure the knife 4 to a sleeve member 39 by means of a screw 36, which extends through the upper part of the knife 4 and through the flattened lower part of the sleeve member 39, and to secure the cutting plate 34 to a base 37 by means of a screw 38 and a nut 40. The cutting plate 34 can then be adjusted angularly by manipulating the screw 38 and the nut 40, whereas the knife can be adjusted angularly by manipulating the screw 36 and axially by shifting the sleeve member 39 on the shaft 3 and by retaining it in the proper position by tightening the set screws 41.

The tape 6, ribbon, belt, strip or the like may be fed into the machine from any suitable holder, reel, or spool provided above the guide or channel 5, preferably from a spool 42, which is supported by a horizontal disk 43, as indicated in Fig. 2.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. Accordingly, I do not wish to be limited as herein shown and described, except to the extent which may be required by the scope of the appended claims.

What I claim and wish to secure by Letters Patent in the United States is:

1. A tape cutting machine comprising a rotating, vertically and angularly adjustable cutting knife adapted to carry out one cut through a strip of material at each revolution; an angularly adjustable cutting plate adapted to support said strip while it is being cut; a guide through which said strip passes before it is cut by said knife, said guide being adapted to turn reciprocatingly 180 degrees during each revolution of said knife; rollers which are pressed toward each other by resilient means and which are adapted to force said strip toward said knife; and a friction gear for driving said rollers.

2. A tape cutting machine comprising a rotating, vertically and angularly adjustable cutting knife adapted to carry out one cut through a strip of material at each revolution; an angularly adjustable cutting plate adapted to support said strip while it is being cut; a guide through which said strip passes before it is cut by said knife; a gear secured to said knife; a toothed segment engaging said gear; a rod connecting said segment to a wheel which is connected to said rotating knife in such a manner that it carries out one half revolution when said knife carries out a complete revolution; rollers being pressed toward each other by resilient means and being connected to each other by spur gears, said rollers being adapted to force said strip toward said knife; and a friction gear for driving said rollers.

3. A belt cutting machine comprising a rotating, vertically and angularly adjustable cutting knife adapted to carry out one cut through a strip of material at each revolution; an angularly adjustable cutting plate adapted to support said strip while it is being cut; a guide through which said strip passes before it is cut by said knife, said guide being adapted to turn reciprocatingly 180 degrees during each revolution of said knife; rollers which are pressed toward each other by resilient means and which are adapted to force said strip toward said knife; and means for driving said rollers, substantially as described.

4. A belt cutting machine comprising a rotating, a vertically and angularly adjustable cutting knife adapted to carry out one cut through a strip of material at each revolution; an angularly adjustable cutting plate adapted to support said strip while it is being cut; a short guide through which said strip passes before it is cut by said knife; a gear secured to said knife; a toothed segment engaging said gear; a rod connecting said segment to a wheel which is connected to said rotating knife in such a manner that it carries out one half revolution when said knife carries out a complete revolution; rollers being pressed toward each other by resilient means and being connected to each other by spur gears, said rollers being adapted to force said strip toward said knife; and a gear for driving said rollers, substantially as described.

MOE SCHIMMEL.